United States Patent

Loureiro Benimeli

[11] Patent Number: 6,148,888
[45] Date of Patent: Nov. 21, 2000

[54] METHOD AND SYSTEM FOR MEASURING AND ADJUSTING PRESSURE OF TIRES

[75] Inventor: Fermin Jaime Loureiro Benimeli, Madrid, Spain

[73] Assignee: Fast Air, S.L., Madrid, Spain

[21] Appl. No.: 08/836,661

[22] PCT Filed: Sep. 1, 1995

[86] PCT No.: PCT/ES95/00103

§ 371 Date: Aug. 5, 1997

§ 102(e) Date: Aug. 5, 1997

[87] PCT Pub. No.: WO97/09187

PCT Pub. Date: Mar. 13, 1997

[51] Int. Cl.[7] .................................................. B60C 23/00
[52] U.S. Cl. ............................ 152/415; 340/442; 141/95
[58] Field of Search .............................. 152/415; 141/95; 340/442

[56] References Cited

U.S. PATENT DOCUMENTS

| | | | |
|---|---|---|---|
| 3,913,632 | 10/1975 | Dudar | 141/95 |
| 4,334,215 | 6/1982 | Frazier et al. | 340/539 |
| 5,179,981 | 1/1993 | Hicks et al. | 141/4 |

FOREIGN PATENT DOCUMENTS

| | | |
|---|---|---|
| 0284895 | 10/1988 | European Pat. Off. . |
| 0301443 | 2/1989 | European Pat. Off. . |
| 2548780 | 1/1985 | France . |
| WO 9403349 | 2/1994 | WIPO . |
| WO 9404398 | 3/1994 | WIPO . |

*Primary Examiner*—Francis J. Lorin
*Attorney, Agent, or Firm*—Merchant & Gould P.C.

[57] ABSTRACT

Method and system for measuring and adjusting pressure of tires of vehicles in order to set the appropriate pressure to a tire when the latter is in temperature and pressure conditions different from nominal conditions, the method and system comprising the steps of measuring the pressure inside the tire, measuring the temperature inside the tire, calculating a pressure value equivalent to the nominal value as a function of said measured values, visualizing the measured values, introducing said values in an air supplying machines, and supplying said calculated pressure to the tire. They system for implementing said method comprises a thermocouple, a pressure tester provided with means in contact with the thermocouple, and an air supplying machine and a connector provided with means in contact with the thermocouple; or alternatively, the system comprises an emitting and sensing device arranged on the surface of the rim inside the tire, a remote control apparatus operating with radiofrequencies' signals and an air supplying machine.

36 Claims, 9 Drawing Sheets

METHOD AND SYSTEM FOR MEASURING AND ADJUSTING PRESSURE OF TIRES

OBJECT OF THE INVENTION

The present invention relates, as its title indicates, to a method which allows to measure tire pressure and adjust it to reference values, taking into account the variations which may have been produced in said reference values due to changes in tire temperature.

BACKGROUND OF THE INVENTION

One of the factors which directly affects the driving of a vehicle is the pressure of the tires and, although checking the pressure should be, in principle a simple operation, when the user attempts to carry out the checking he finds a series of problems that in many occasions lead him to give up the attempt as such operation implies loss of time while it also gives rise to getting the users hands dirty, or at best, the user inflates tires untill a value of pressure which he believes to be the correct one, while the appropriate pressure at that particular moment would be different.

The problem for the user when checking the pressure is that he has to obtain the pressure values corresponding to front and rear wheels; however these values vary depending upon whether the tires are cold or warm. As the quantification of these factors is subjective, the user usually chooses an average pressure or a reference pressure value that he considers the most suitable.

At present there are known pressured-air supplying machines on the market, which incorporate a series of push-buttons, each one of which corresponding to a pre-determined pressure value, so that when one of the push-buttons is pressed the machine adjusts the tire pressure to the value assigned to the pressed push-button.

The influence of temperature of the tires on their pressure is important; that is why tire manufacturers recommend an increase of the reference value of 0.3 bar if the pressure is checked when tires are warm. In doing so, the problem of determination of the temperature of the tire comes across, as this temperature may vary more than 50° C. depending upon the environmental temperature and, on the other hand, upon whether the tire has been resting or it has just finished running at a high speed.

DESCRIPTION OF THE INVENTION

In order to overcome these problems, the system which is object of this invention has been developed, which allows to determine the pressure equivalent to the nominal pressure given by the tire manufacturer, as a function of the temperature of the tire at the moment of carrying out the reading and to supply said equivalent pressure by means of a pressured-air machine, which forms part of the system. The equivalent pressure is therefore a pressure which under temperature conditions different from the environmental temperature would be the appropriate one for the use of the tire.

The method of the invention therefore permits, during the pressure checking and during the adjustment of the same, to know which is the present pressure of the tire, the temperature inside the same and the corresponding pressure that it should have, as a function of the temperature inside the tire as well as the nominal pressure at environmental temperature given by the manufacturer.

Once the temperature and the present pressure of tire are known, the user can effect the pressure adjustment either manually, or by using an automatic adjustment procedure.

In order to know the data corresponding to the present temperature and pressure of a tire, the system of the invention uses a sensor mechanism installed inside the tire.

According to an embodiment of the invention, the system consists of a valve which may be the conventional inflating valve which incorporates a thermocouple, a portable pressure tester and a pressured-air supplying machine.

The valve incorporates a thermocouple which emerges out from the back zone of the valve, thereby permitting the thermocouple remain located inside the tire when the valve is mounted thereon, the conductors of the thermocouple having at the ends thereof a pair of contact points outside the valve at the front zone of the same.

The portable pressure tester, of digital type, has a mouth-piece for connection with the valve, and contact points which may be connected to the contact points of the valve thermocouple, the tester being capable of reading the pressure of the tire and the temperature inside the same simultaneously.

The tester has several push-buttons by means of which the nominal pressure value of the tire at ambient temperature, which is a value given by the manufacturer, is is introduced therein; and a display on which nominal pressure values, temperature detected by the thermocouple, present pressure of the tire and the correct pressure of the tire are visualized. The later is calculated from the data corresponding to the nominal pressure at environmental temperature and the detected temperature, by means of a microprocessor included in the tester.

In order to obtain the formula which would permit the calculation of the pressure corresponding to a nomial pressure in terms of temperature, the following premises are assumed:

1. Tire volume variation is negligible in spite of pressure changes, as the pressure variation affects the rigidity of the tire and the inside canvas frame avoids a substantial change of volume.
2. Pressure variation due to temperature is linear, as there are no changes in gas physical state.

The above point is based on Gay-Lussac's Law of the Behaviour of Gases, that is governed by the following formula:

$$P \cdot V = n \cdot R \cdot T$$

Wherein P, V and T are variables of pressure, volume and temperature respectively, n is the number of moles and R is the gas constant of perfect gases. In case of constant volumes, the following proportion can be derived from the above formula:

$$P_0/T_0 = P_1/T_1$$

Wherein $P_0$ is the nominal pressure recommended by the manufacturer at environmental temperature (293 K, equal to 20° C.).

Therefore, the formula that permits the calculation of the equivalent pressure in terms of temperature is the following:

$$P_1 = (T + 273) \cdot P_0 / 293$$

Wherein $P_1$ is the corrected equivalent pressure in terms of temperature, T is temperature (in °C.) measured inside the tire by the thermocouple, and $P_0$ is the pressure at ambient temperature (293 K) recommended by the vehicle manufacturer.

The system of this invention further comprises an air supplying machine to adjust tire pressure, taking into consideration the temperature inside the same. This machine has a connection mouth for connection with the tire valve, provided with contact means suitable for making contact with the contact points of the thermocouple when the connection mouth is connected to the valve, the machine thus performing simultaneous reading of values corresponding to the present pressure of tire and the present temperature inside the same.

In the same manner as that of the pressure tester, the air supplying machine has a keyboard, by means of which the nominal pressure value is introduced; a microprocessor adapted to calculate an equivalent pressure, using data from the nominal pressure and the temperature inside the tire; and a display on which data regarding nominal pressure, present pressure, temperature and equivalent pressure are visualized.

Said connection mouth for connection with the valve further has means to effect a safe blocking on the valve when said connection mouth is fixed on the same.

The arrangement of the blocking means is such as to permit the mouth to remain firmly attached to the valve during the operation of pressure adjustment, whereas when the operation is ended, it can be easily unblocked by the user by pulling from an external case of the same. This disposition is made possible due to the use of a generally cylindrical body with longitudinal grooves which allow said body to be subject to perimeteral compression, thus reducing its diameter, thereby making possible a firm grip of the same over a valve.

Furthermore, said air supplying machine optionally incorporates an auxiliary tool which permits to screw or to unscrew the core of the valve if deemed necessary.

Said tool consists of an essentially cylindrical body which has a cavity at one end, axially disposed to allow the placing of a rod shaped element therein whose free end has a configuration suitable for being coupled to a core. Said tool further has, at the opposite end thereof, another cavity axially arranged, which has a wrench-like configuration which permits the manipulation of valves, end caps or any element related to this field.

The tire pressure adjustment is carried out by a pneumatic equipment included within the machine, said equipment being activated either by a control circuit governed by the microprocessor if the user chooses the equivalent pressure calculated by the machine; or manually by means of using push-buttons (+) and (−), in case that the user prefers to put a pressure different to the calculated one.

According to another embodiment of the invention, the process of checking the present temperature and pressure of the tire is carried out by means of a sensor and emitter device attached to the surface of the rim of the tire which remains inside the tire, so that in operation conditions, it can directly detect said present pressure and temperature of the tire.

Thw data obtaines are subsequently converted into electronic signals which are then converted into radiofrequency waves and are transmitted towards the outside of the tire.

Said radiofrequency waves are later received by a portable receiver set arranged as a remote control apparatus which also serves for switching said receiver and emitter device on.

Said remote control apparatus further has several push-buttons by means of which the nominal pressure value of the tire at ambient temperature, which is a value given by the manufacturer, is manually introduced therein; and a display means for displaying values of the nominal pressure, the present temperature and pressure both detected by the sensor device, as well as the equivalent pressure of the tire which is calculated by a microprocessor included in the remote control apparatus in the same manner as described hereinbefore in the case of the pressure portable tester.

Once the equivalent pressure which is required for the tire at the moment of checking is known, the user introduces this data into an air supplying machine with characteristics as mentioned above, in order to adjust the tire pressure.

It is to be pointed out that in this embodiment, the air supplying mouth would not need the use of contact means to perform the proper reading of the present temperature and pressure inside the tire.

The receiver and emitter device essentially consists of at least one thermocouple, a pressure detector, a circuit for reception and emission radiofrequency waves, a circuit for converting radiofrequency waves into electronic signals and vice versa and a power supply circuit which operates by using electronic energy supplying batteries.

Advantageously the air supplying machine incorporates means for receiving radiofrequency signals emitted from said remote control apparatus in order to detect said signals and process them to obtain data related to the equivalent pressure which has to be supplied to the tire by the air supplying machine itself.

For that purpose, said machine may incorporate a radiofrequency waves receiver and a converter for converting radiofrequency waves into electronic signals which are later supplied to the microprocessor incorporated in the air supplying machine.

In this manner, the user will initially use the remote control apparatus to detect the present temperature and pressure of the tire, calculate the equivalent pressure to be given to the tire, and transmit the value thereof to the air supplying machine, which after receiving said value, starts the operation of adjusting the tire pressure in accordance with the equivalent pressure.

Optionally, the remote control apparatus may be incorporated in the front panel inside the vehicle where the user can control and check the pressure and the temperature of the tire without having to get out of the vehicle, or even perform the controlling and checking during the driving.

In this latter case, the remote control apparatus will effect the measurement of present pressure and temperature of each tire of vehicle separately and it will visualize them successively, or by according to the selection choice of the user.

For this purpose, the microprocessor of the remote control apparatus must be programmed to effect independant readings of each one of the wheels.

The method and system for vehicle tire pressure measuring and adjusting described above further allows the automatic execution of certain functions, without a direct intervention of the user.

One of said functions, described herein in a non-limitative manner, is to perform the pressure measurement and adjustment of each tire of the vehicle using a valve locating mechanism and a subsequent connection of the air supplying mouth-pieces to each valve.

In order to carry out this operation, the wheels of the vehicle are located on rollers operated by means of a motor or a similar mechanism so that their synchronized rotation makes the vehicle wheel rotate untill its valve is placed at a pre-determined position where it will receive an air supplying mouth-piece which carries out the measurement and the further adjustment of tire pressure.

To place tire valve in said pre-determined position use is made of a proximity detection process.

DESCRIPTION OF THE DRAWINGS

To complete the description provided and in order to achieve a better understanding of the features of the invention the present description is accompanied by a series of drawings, as an integral part of the same, representing in an illustrative and non-limitative manner the following.

PREFERRED EMBODIMENT OF THE INVENTION

Figure 1:
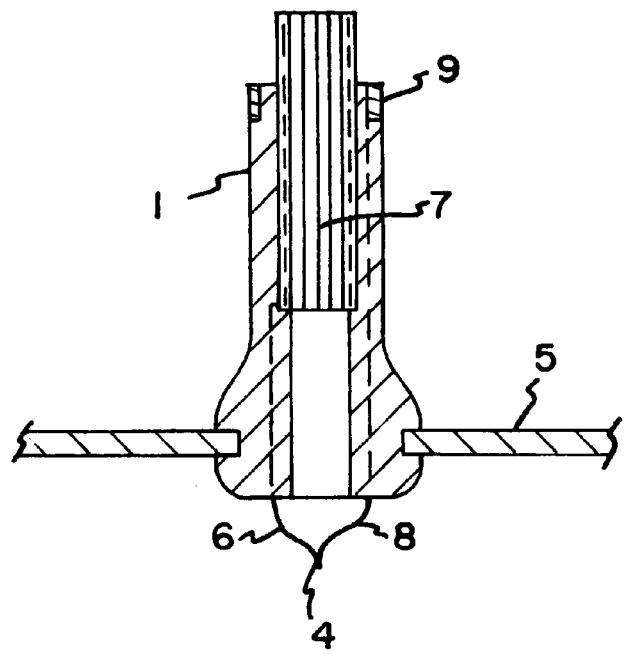
FIG. 1 shows a front view of the valve which forms a part of the system for measurement and adjustment of tire pressure, mounted on a tire, wherein the peripheral material of the same has been longitudinally cross-sectioned to allow the observation of the thermocouple.
Figure 2:
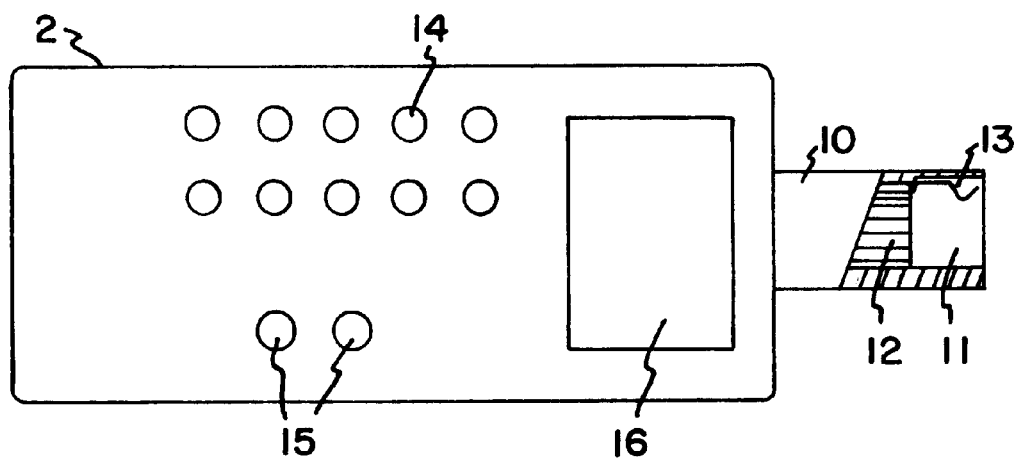
FIG. 2 shows a front view of the pressure tester, wherein the connection mouth of the same has been partially cross-sectioned.
Figure 3:
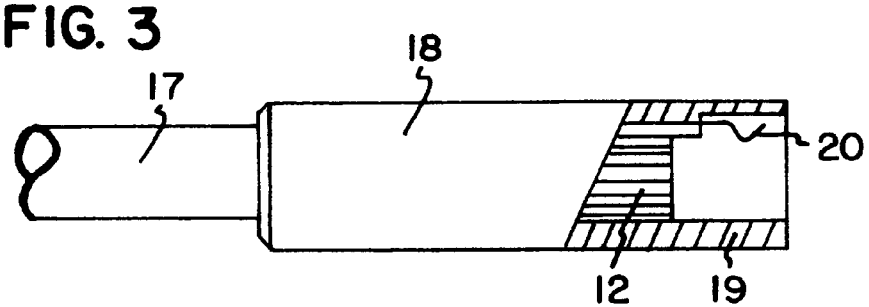
FIG. 3 represents a partially cross-sectioned front view of the connection mouth of the pressured-air supplying machine.
Figure 4:
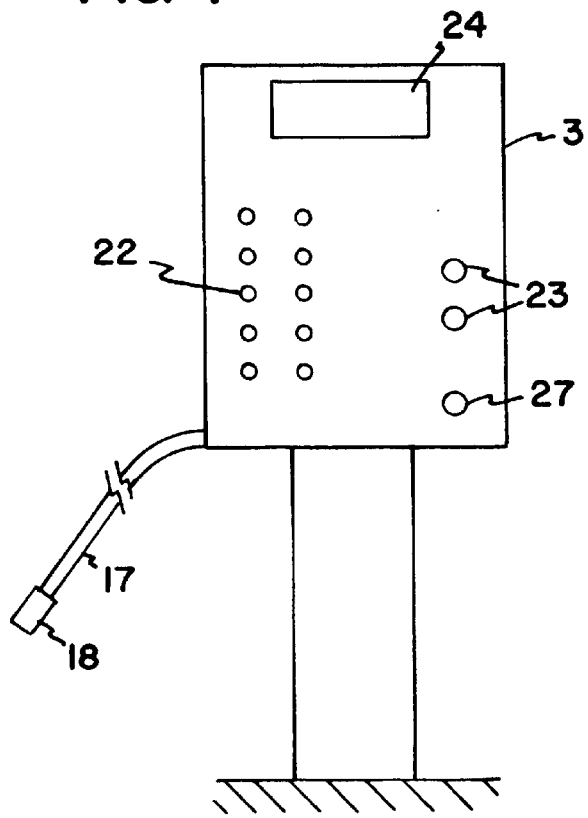
FIG. 4 shows a front view of the air supplying machine.
Figure 5:
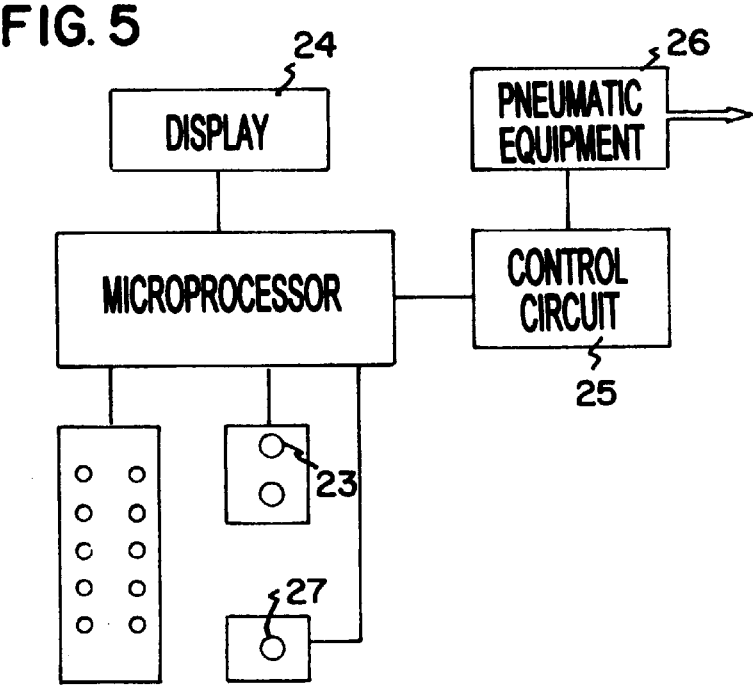
FIG. 5 shows a block diagram of the air supplying machine.

As it may be observed from the referenced figures, the tire pressure measuring and adjusting system consists of a valve (1), a pressure tester (2) and an air supplying machine (3).

The valve (1) incorporates a thermocouple (4) which juts out the rear zone of the same such that the thermocouple (4) remains located inside the tire (5); one of the conductors (6) of the thermocouple is connected to a cylindrical-shape metal body (7) of the valve (1) whereas the other conductor (8) is connected to a peripheral ring (9) embedded inside the insulating material which evolves the metallic body (7), thereby, both contact means (7) and (9) remain separated and electronically isolated.

The pressure tester (2) has a tip (10), which can be coupled to the valve (1) to read the inner pressure of the tire (5); this tip has an extension made of insulating material (11) and a central conductive part (12).

A contact (13), sized to touch the contact (9) of the thermocouple when the tester (2) is coupled to the valve (1), emerges from the isolating part (11); when performing this coupling to determine tire pressure, the metallic body (7) of the valve and the central part of the tester (12) also make contact with each other, that is why it carries out the reading of the present pressure and the temperature inside the tire (5) simultaneously.

The present pressure and temperature values are registered by a microprocessor inside the tester (2).

The tester has several push-buttons (14) externally which have pre-determined values assigned thereto, corresponding to the pressure values most commonly used. By switching on the corresponding push-button (14) the nominal pressure value, at environmental temperature, given by the vehicle manufacturer, is introduced in the microprocessor.

The tester (2) further has two other push-buttons (15) which allow to increase or reduce the nominal pressure value as provided by means of any of the push-buttons (14), these being employed to introduce the nominal pressure value in the microprocessor in the case where said value would not coincide with anyone of those assigned to the push-buttons (14).

When the microprocessor of the tester (2) already has the nominal pressure values of the tire, the temperature inside the same and its present pressure, it calculates the pressure equivalent to the nominal one bearing in mind the temperature variation and it visualizes all data on the display (16) of the tester, so that user can check if the present pressure corresponds to the calculated equivalent pressure.

The machine (3), in charge of adjusting tire pressure incorporates a host (17) which ends at a mouthpiece (18), suitable to be coupled onto the valve (1).

The mouthpiece (18) defines an external isolating part (19), from which a contact means (20) emerges, and an inner part (21) made of conductive material which forms another contact means; such that when the mouthpiece (18) of the machine (3) is coupled onto the valve (1), contact means (20) and (21) of the mouthpiece (18) are connected to those (7) and (9) of the thermocouple, the machine (3) simultaneously performing the registration of the temperature and pressure in a microprocessor located inside the same.

Figure 9:
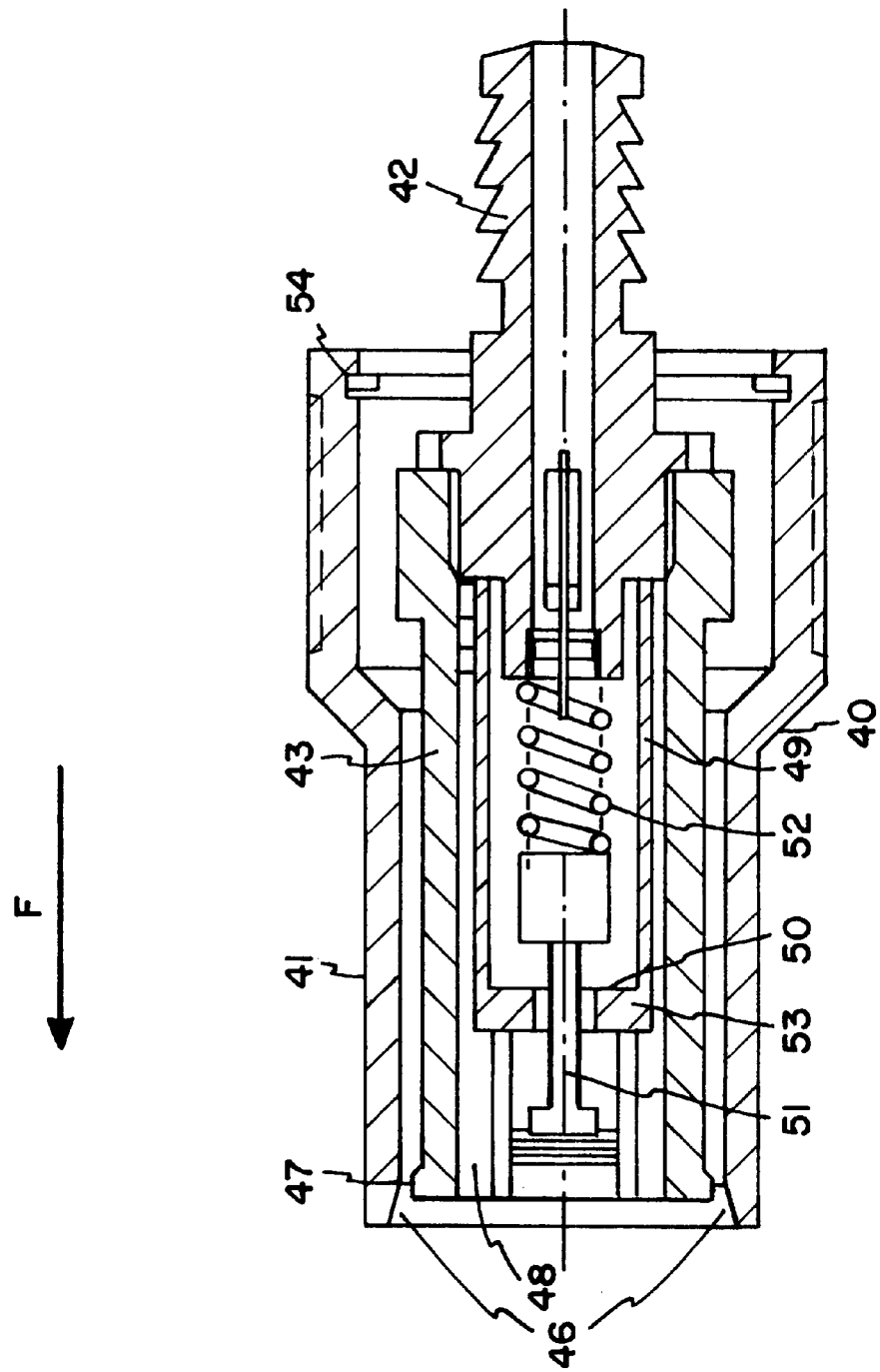
FIG. 9 is a front view of an air supplying mouth with blocking means axially cross-sectioned according to a vertical plane.
Figure 9A:
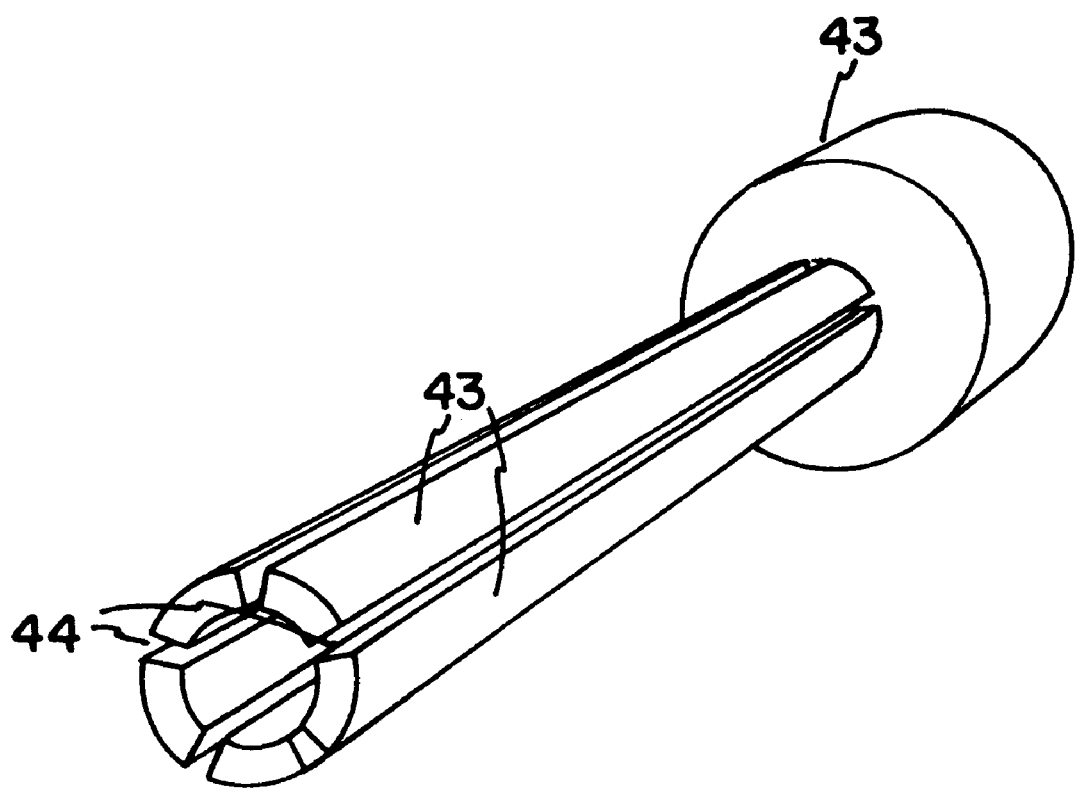
FIG. 9(a) is a perspective view of a blocking body of the mouth of FIG. 9.

According to an embodiment of the mouthpiece, represented in FIG. 9, the mouthpiece (40) consists of a evolving body (41) which has a cylindric portion with a larger diameter over the surface of which there are several ribs presented to facilitate the handling of the mouthpiece and another cylindrical portion with a smaller diameter which forms together with the first portion the evolving body inside which the mouthpiece components are located. Said components include an outlet tip (42) which is threaded at an end inside a blocking body (43). This blocking body (43) has a generally cylindrical configuration which, in one end where said outlet tip (42) is threaded, has a longer diameter and along the remaining surface has several longitudinal grooves (44) as can be seen in FIG. 9(a). Said grooves allow the mobility of movable portions (45) adjacent to the same as the blocking body (43) is made of a preferably metallic material with certain flexibility in a radial direction.

The blocking body (43) has mobility in an axial direction inside the evolving body (41) whereas movable portions (45) remain located in the same. Said evolving body (41) has at its end opposite to the outlet tip (42) and on its inner surface, a perimetric recess (46). Additionally, the blocking body (43) has in the free ends of each one of the mobile portions (45) a salient portion (47).

With this arrangement the blocking body (43) has mobility inside the evolving body (41) untill the point of coincidence of salients (47) with the perimetric recess (46). At this point salients (47) fit into perimetric recess (46) due to the effect of mobile portions (45) which tend to open outwards in a radial direction thereby obtaining a larger diameter in the opening part (48). Therefore, when the end of a tire valve is introduced into the opening (48) of the blocking body (43) when the latter is in a situation of the opening (48) having its larger diameter, the evolving body (41) slides over the blocking body (43) in a direction opposite to the entry of the valve, for example in the direction of arrow "F" in FIG. 9.

Said movement makes the salient portions (47) of the blocking body (43) to move out of the perimeteral recess (46) thereby reducing the diameter of the opening (48) which has the end of the tire valve inside.

Said diameter reduction of opening (48) on the valve produces the blocking effect of the blocking body (43) on the valve.

In order to unblock the valve, the evolving body (41) slides in a direction opposite to arrow "F" untill salient portions (47) again fit into the perimeteral recess (46), thereby increasing the diameter of opening (48) which allows the valve of the same to be moved out.

The mouthpiece (40) further consists of a series of pieces which allow its functionality such as a cylindrical sleeve (49) which at a first end thereof is attached to the outlet tip (42) and at another end has a base surface (50) with a central orifice through which rod (51) passes. This latter, at the end corresponding to the entry of the tire valve, has a plane base which rests over the valve core, and at the opposite end it has a cubic or rectangular-prismatic configuration which permits the passage of air and which rsts on an end of a spring (52) whose effect is that rod (51) exerts pressure on valve core. On the base surface (50) of the sleeve (49) an elastic joint (53), made of rubber for example, is arranged whose objective is to provide sealing when the valve is introduced into the opening (48) and lays on the joint (53). Additionally the cervoclip (54) arranged in the opening corresponding to outlet tip (42) tends to avoid the inside mechanism of the evolving body (41) from moving out.

The air supplying machine (3) optionally has an additional tool which permits the threading and unthreading the core of tire valves.

Figure 10:
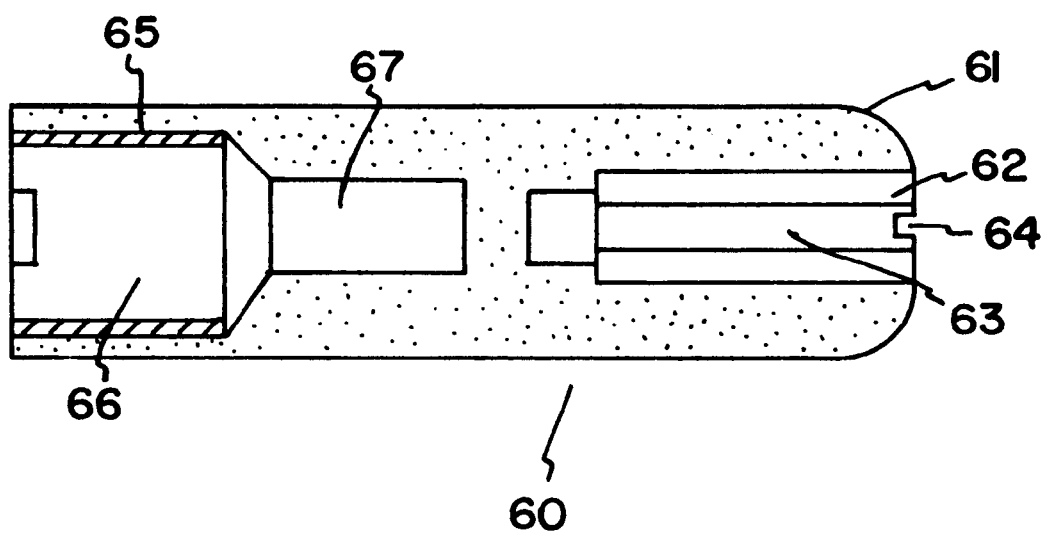
FIG. 10 is a front view of an auxiliary tool employed to screw and to unscrew the valve core of a valve, axially cross-sectioned according to a vertical plane.

Said tool (60), as shown in FIG. 10 consists of an essentially cylindrical body (61) which has at an end a cavity (62) axially disposed to permit the lodging of a rod shaped utensil (63), whose free end (64) has a suitable configuration to couple on a core. Said rod (63) remains fixed inside the cylindrical body (61).

At its opposite end, tool (60) has another cavity (65) axially disposed which has a first portion (66) with a larger diameter and a keyshaped configuration which permits operation on valves, end caps or any element related to the field of tires. Said cavity (65) also consists of a second portion (67) intended to allow the introduction of the ends of valves while they are being manipulated by means of the first keyshaped portion (66).

The machine (3), in the same manner as that of the tester, externally has push-buttons (22) which have specific values assigned thereto corresponding to the pressure values mostly used. Each one of said push-buttons (22) may preferably have a colour specially assigned to its pressure value. By activating the corresponding push-button (22), the nominal pressure value of tire at environmental temperature as given by the vehicle manufacturer, is introduced into the microprocessor, the microprocessor making the calculation of the pressure equivalent to the nominal depending on temperature. The machine (3) further incorporates two push-buttons (23) which permit to adjust the nominal pressure value in the case where it would not coincide with any push-button (22).

The microprocessor of the machine is connected to a display (24), on which data regarding nominal pressure, present pressure, equivalent pressure and temperature are displayed; and to a control circuit (25) which controls a pneumatic equipment (26) in charge of adjusting the tire pressure by introducing or extracting air in and out of the same respectively, by means of the hose (17).

In this manner, if push-button (22) corresponding to a pre-determined nominal pressure is activated and the mouth-piece (18) is connected to the valve (1), the microprocessor calculates the equivalent pressure and acts on the pneumatic equipment (26) by means of control circuit (25), adjusting the tire pressure to the calculated equivalent pressure value.

If the nominal pressure does not coincide with any of the values assigned to the push-buttons (22), the value is manually adjusted by push-buttons (23), the machine then providing the selected pressure, as if it were a conventional machine.

If any pressure is manually selected by actuating push-buttons (23) and later it is desired that the machine provide the pressure equivalent to the same as a function of temperature, it will be sufficient to press the push-button (27), which makes the microprocessor calculate the equivalent pressure and to order the pneumatic equipment to supply said pressure.

Figure 6:
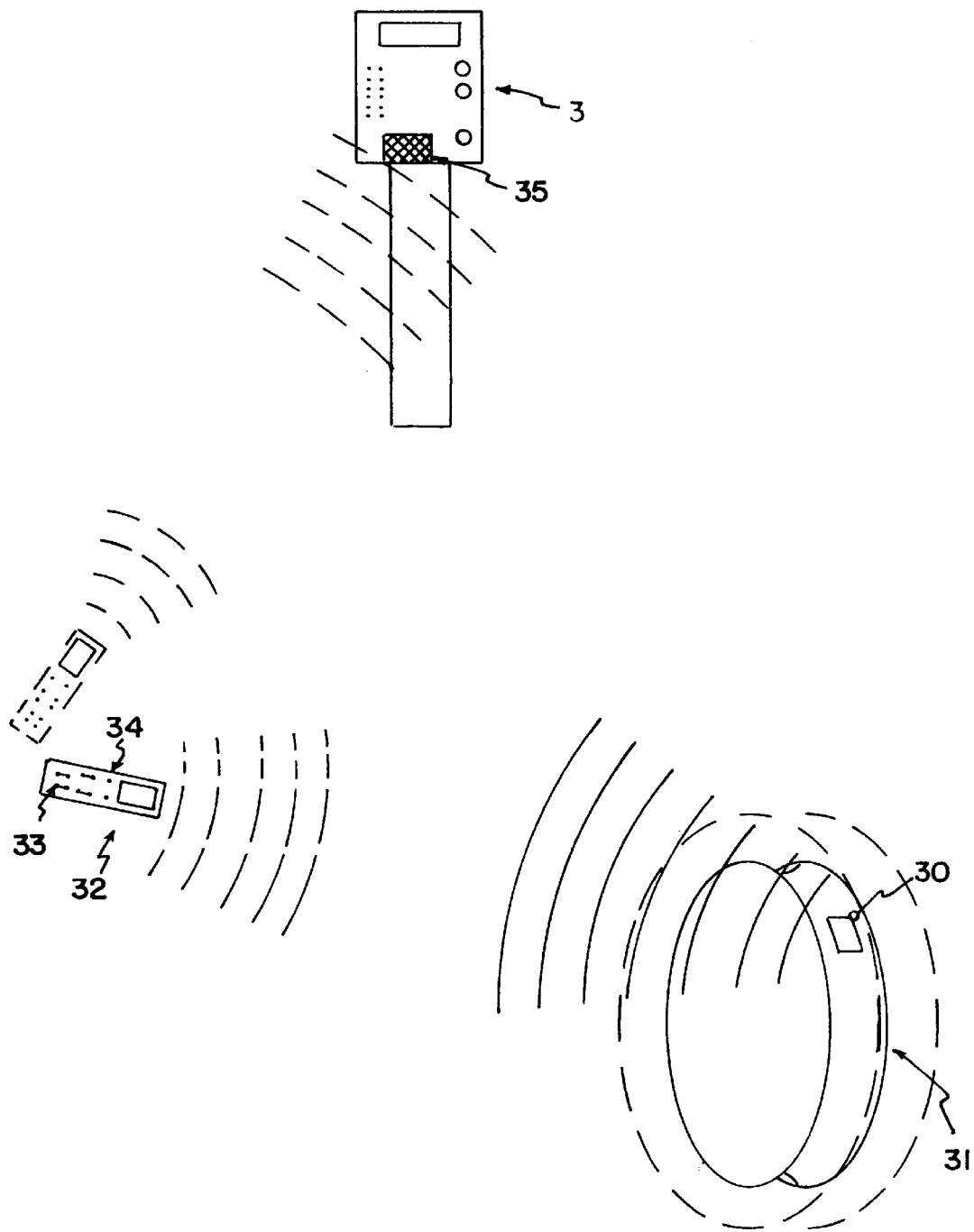
FIG. 6 shows a diagram of the setting of a sensor and emitter device on a wheel rim as well as the remote control apparatus in relation to the tire and the air supplying machine.
Figure 7:
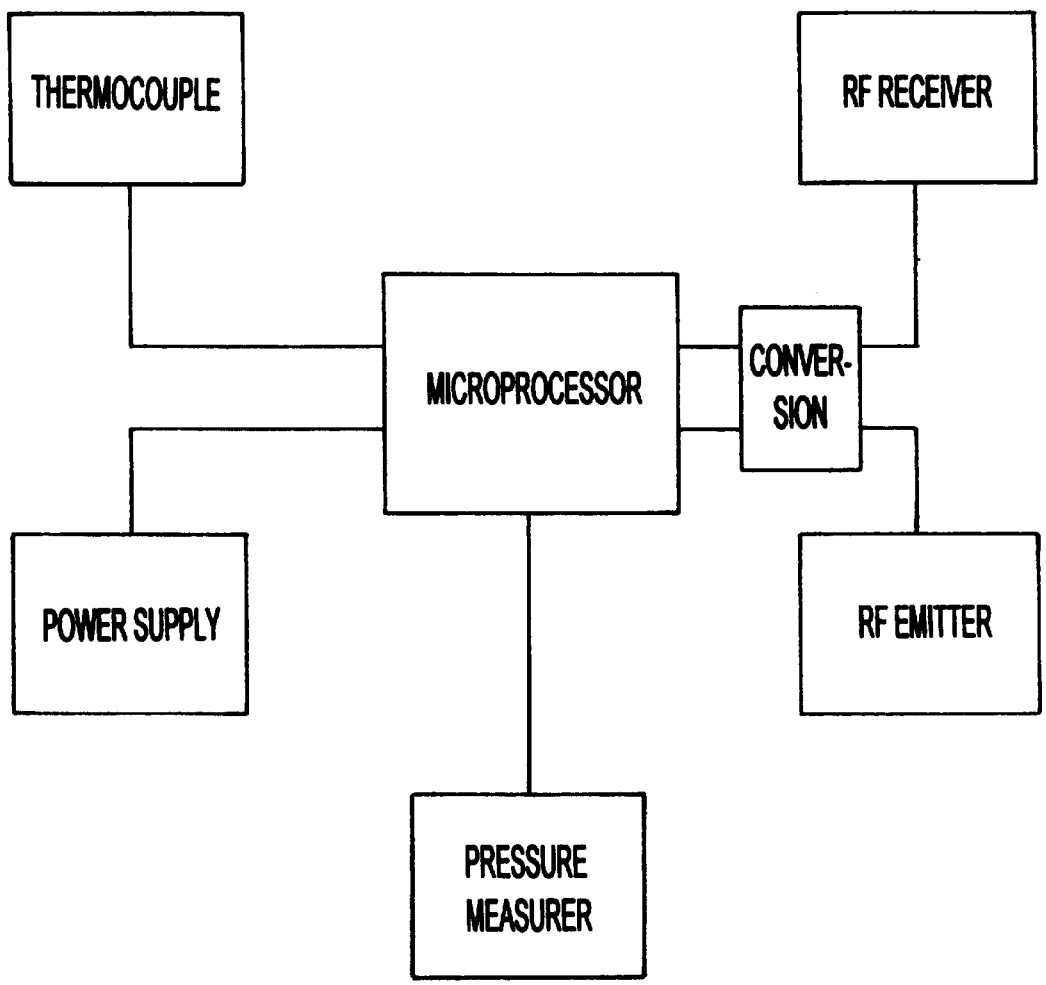
FIG. 7 is a block diagram of the main components of a sensor and emitter device.
Figure 8:
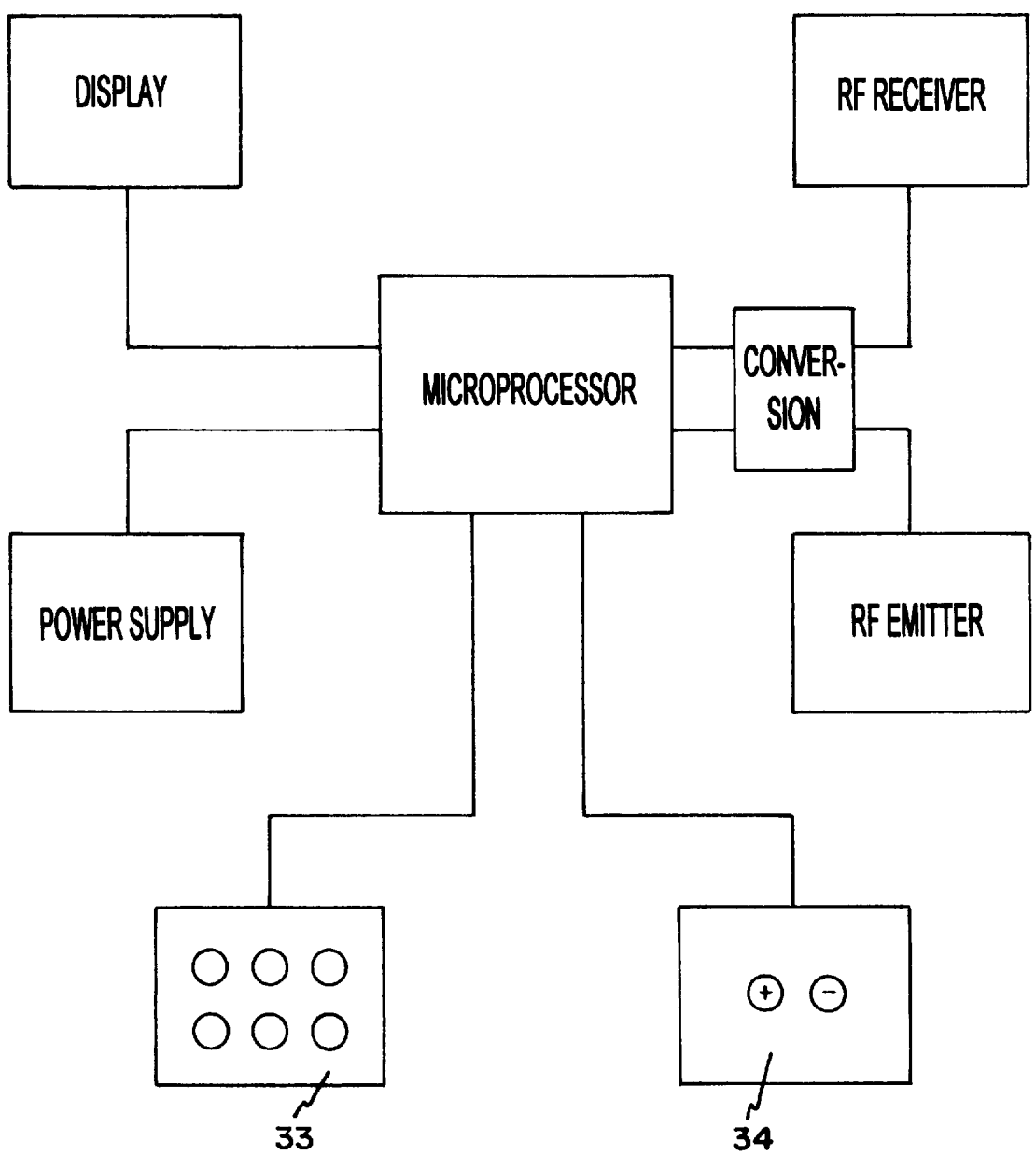
FIG. 8 is a block diagram of a remote control apparatus.

Referring to FIGS. 6, 7 and 8 an alternative embodiment of the object of the invention is described, according to which a sensor and emitter device (30) is attached to the surface of a tire rim (31) so that when said rim carries the corresponding pneumatic tire (shown in broken lines), said device (30) remains inside the tire to effect the detection of the present pressure and temperature of tire.

Said device, as it can be seen in FIG. 7, consists of a microprocessor which governs the operation of the same, a radiofrequency wave receiver and emitter, a converter of radiofrequency waves into electronic signals and vice versa, a pressure meter and a thermocouple.

The remote control apparatus (32) consists of a microprocessor, a display device (DISPLAY), a radiofrequency wave receiver and emitter, a converter of radiofrequency waves into electronic signals and vice versa, a supply device, normally a battery, a keyboard (33) and several push-buttons (34) to increase and decrease values shown in the display.

With this arrangement and in order to carry out the measurement of the present pressure and temperature of tire, the user uses the keyboard (33) to send the correspondig signal for commanding the sensor and emitter device (30) so that the latter performs the corresponding readings of pressure and temperature.

As it has been mentioned hereinabove said command is carried out through radiofrequency waves which are transmitted through the transmitter set of the remote control apparatus and which are received by the receiver of the sensor and emitter device (30). Said radiofrequency waves are later converted into electronic signals by means of the converter of said device (30), which are sent to the microprocessor of the same. The latter, having received the corresponding signal, effects the measurement of the pressure by the pressure meter, and of the temperature by the thermocouple of the sensor and emitter device (30). Once the measurements are carried out, the microprocessor sends the signals corresponding to measured data to the converter for their convertion into radiofrequency waves which are emitted towards the outside by the radiofrequency emitter of the sensor and emitter device (30).

The waves emitted by said device (30) are received by the radiofrequency receiver of the remote control apparatus (32) and once converted into electronic signals by the converter of said apparatus, they are sent to the microprocessor of the same. This latter, according to the received values calculates the equivalent pressure with which the tire is to be provided. All data related to the present pressure and temperature and nominal pressure can be visualized through the display of the remote control apparatus (32).

In this manner, the user obtains a pressure value which is the appropriate one for the tires under the conditions of checking. For that reason, it would be sufficient to introduce the value corresponding to said equivalent pressure in the air supplying machine and proceed with the adjustment of tire pressure.

Advantageously, the air supplying machine (3) incorporates a radiofrequency waves receiver device (35) capable of receiving the waves emitted by the remote control apparatus (32) as it is shown in FIG. 6. In this way, once the value of pressure equivalent to the nominal for tire has been obtained, the user directs the remote control apparatus towards the air supplying machine (3) and by pressing the corresponding push-button, the user immediately sends by way of radiofrequency waves the value of the equivalent pressure to the receiver device (35) of the air supplying machine (3). Said receiver device (35) provides the microprocessor of the air supplying machine (3) with the value of the equivalent pressure by means of electronic signals, the microprocessor thus automatically starting to supply the equivalent pressure to the tire. The process for the reception of radiofrequency waves untill their sending to the microprocessor is similar to that of the sensor and emitter device (30) and that of the remote control apparatus (32) for which in order to avoid repetitions its detailed description is ommited.

It is to be mentioned that the air supplying machine may carry out, by means of its microprocessor, the calculation of the pressure equivalent to the nominal, so that in this case this task would not be carried out in the remote control apparatus; the latter therefore would only be limited to the sending of the values of the present temperature and pressure of tire to the air supplying machine.

Optionally the remote control apparatus (32) may be installed into the vehicle, for example in the front panel of the inner space of the same, in such a manner that the user, for example the driver, while driving can effect the checking of the present pressure and temperature of each tire of the vehicle.

The method for measurement and calculation of the equivalent pressure is similar to that of the previous case except that in this case the remote control apparatus would emit and receive radiofrequency waves related to each wheel through independent activator devices installed nearby each tire and intended to activating a sensor and emitter device (30) of each corresponding wheel.

Said independent activator devices are installed in the bodywork of the vehicle and are connected by cables to the remote control apparatus installed inside the vehicle.

In this way the driver or any other occupant of the vehicle would be able to check data regarding the present pressure and temperature and to calculate the equivalent pressure of each wheel, even while the vehicle is in movement.

In this case the remote control apparatus displays the values corresponding to each wheel independently, either successively or by pushing a key corresponding to a wheel and further keys corresponding to other wheels.

The method and the system for pressure measurement and adjustment described hereinabove further permit the execution of certain functions in an automatic manner and without the direct intervention of the user.

One of said functions, here described in a non-limitative manner, is to effect the pressure measurement and adjustment of all the tires of the vehicle automatically.

Figure 11:
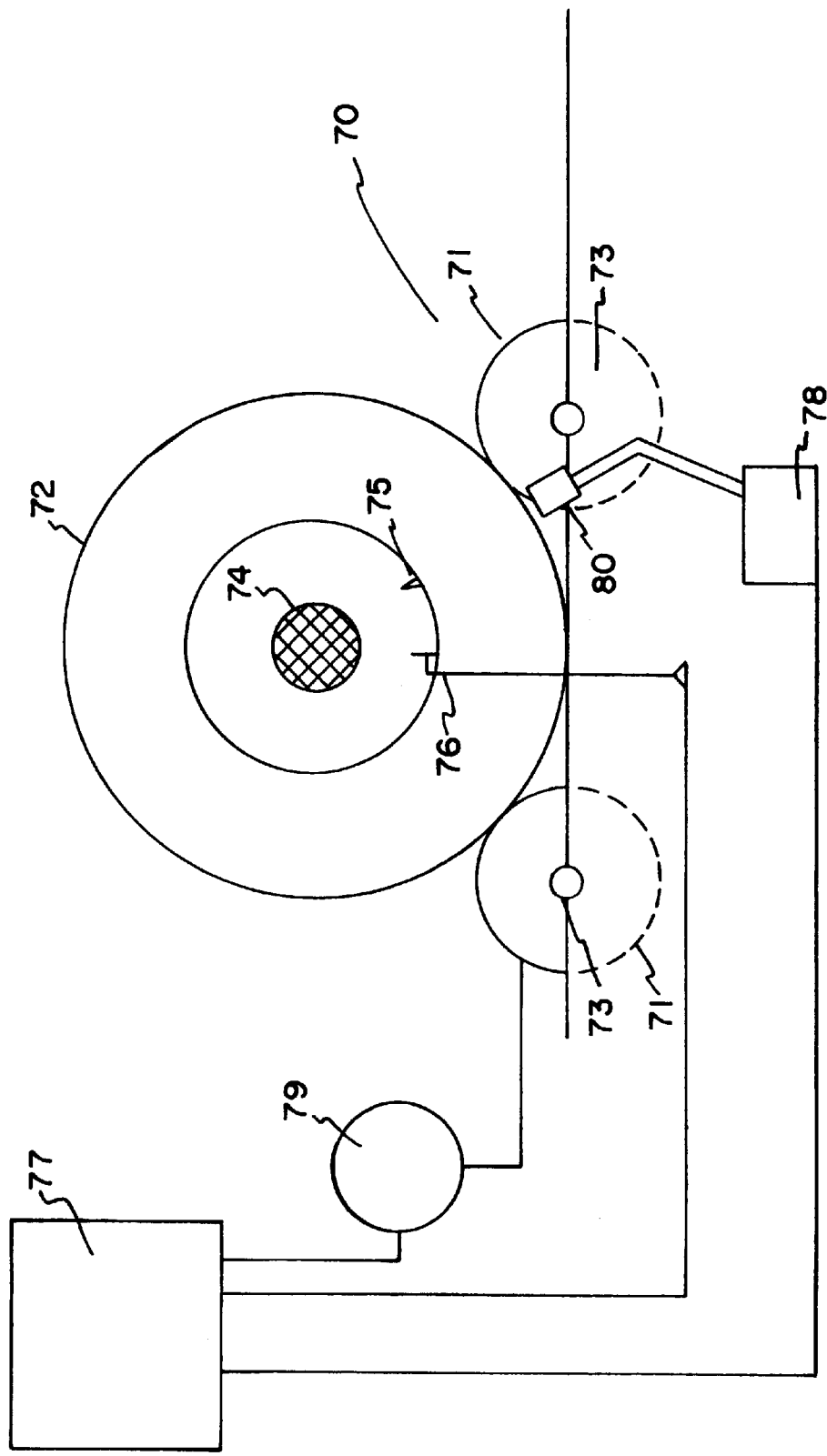
FIG. 11 is a diagram of an automatic pressure measurement and adjustment system using rotatable rollers.

In order to do so, a mechanism for locating the valve of the tire is used. As it is shown in FIG. 11, said localization mechanism (70) consists of several rollers (71) arranged to allow the wheel (72) to be situated thereon, while they are capable of rotating around a respective axis (73) by means of the activation of a motor (79) or a similar system, in such a way that their synchronized rotation forces the wheel (72) to rotate around its axis (74).

Due to said rotation of the wheel (72), the tire valve (75) moves in a circular path untill a proximity detection device (76) detects its presence. The detection of the presence of valve (75) is communicated by electronic signals to a control equipment (77).

Said equipment uses a microprocessor (not shown in figure) which governs the automatic operation of the whole system.

After having detected the presence of said valve, said microprocessor sends a stopping signal to the working mechanism (79) thereby stopping the rotation of roller (72). Therefore valve (75) remains situated in a pre-determined position to later receive the air supplying mouthpiece (80).

Once the valve is situated in said pre-determined position, the microprocessor of the control equipment (77) commands a mechanism (78) for activating the air supplying mouthpiece (80) to make the latter move and be placed on the valve (75).

Once the mouthpiece (80) is placed on the valve (75), the process of pressure measurement and adjustment is carried out as described above.

This automatic operation system may be installed in places where vehicles call in order to obtain services such as a car wash, a vehicle technical inspection station, etc.

It is not considered necessary to make the present description more extensive in order to let any expert in the matter to understand the scope of the invention and the advantages which are derived from the same.

The terms in which this description has been drafted should always be taken in a wide and non-limitative sense.

Materials, shape, size and disposal of elements are susceptible to variation as long as it does not imply an alteration of essential features of the invention, which are claimed as follows.

What is claimed is:

1. A method for measuring and adjusting pressure of one or more tires intended to provide the tire with an appropriate pressure when the tire is under conditions of temperature and pressure unequal to nominal values of temperature and pressure which correspond to a temperature defined as ambient temperature, and a pressure defined as the appropriate pressure for the tire at ambient temperature while the tire is at rest, the method comprising the following steps:

measuring the pressure inside the tire;

measuring the temperature inside the tire;

calculating a pressure value equivalent to the nominal pressure as a function of said measured temperature value, said calculated equivalent pressure being an appropriate pressure for use in the tire at the measured temperature conditions;

displaying the measured temperature and pressure values, as well as the value of the pressure calculated as equivalent to the nominal as a function of said measured value of temperature;

introducing said calculated equivalent pressure value into an air supplying machine; and supplying said calculated equivalent pressure into the tire.

2. The method according to claim 1, wherein the measured pressure and temperature values of the tire are communicated outside the tire by means of electronic signals.

3. The method according to claim 1, wherein the measured pressure and temperature values of the tire are communicated outside the tire by means of radiofrequency waves.

4. The method according to claim 1, wherein the calculation of the pressure value equivalent to the nominal pressure as a function of the measured temperature is carried out in a pressure tester by means of a microprocessor incorporated into the same.

5. The method according to claim 1, wherein the calculation of the pressure value equivalent to the nominal pressure as a function of the measured temperature is carried out in a air supplying machine by a microprocessor incorporated in the same.

6. The method according to claim 1, wherein the calculation of the pressure value equivalent to the nominal pressure as a function of the measured temperature is carried out in a remote control apparatus by a microprocessor incorporated in the same.

7. The method according to claim 4, wherein the nominal pressure values of the tire at ambient temperature are introduced into the tester through a number of push-buttons.

8. The method according to claim 5, wherein the nominal pressure values of the tire at ambient temperature are introduced into the air supplying machine through a number of push-buttons.

9. The method according to claim 6, wherein the nominal pressure values of the tire at ambient temperature are introduced into the remote control apparatus through a number of push-buttons.

10. The method according to claim 1, wherein the value of the pressure equivalent to the nominal pressure as a function of the present temperature and pressure of the tire is communicated to the air supplying machine by electronic signals.

11. The method according to claim 1, wherein the value of the pressure equivalent to the nominal pressure as a function of the present temperature and pressure of the tire is communicated to the air supplying machine by radiofrequency signals.

12. A system for measuring and adjusting pressure of tires, the system comprising:
   A) a tire valve which incorporates a thermocouple for measuring a temperature inside the tire,
   b) a pressure tester for measuring a pressure inside the tire, said pressure tester including a mouthpiece provided with a pressure inlet and contact means suitable for being connected to said thermocouple,
   c) a processor adapted and configured for receiving a nominal pressure value of the tire at ambient temperature, and measured temperature and pressure values from the thermocouple and the pressure tester, and adapted and configured for calculating the pressure equivalent to the nominal pressure as a function of the measured temperature value, and
   d) a pressured-air supplying machine, provided with a pneumatic inflating equipment associated to a hose for air passage, which ends at a connection mouthpiece provided with contact means suitable also for being connected to the tire valve thermocouple.

13. The system according to claim 12, characterized in that the thermocouple emerges out from the rear zone of the valve such that it is placed inside the tire and it consists of conductor means which pass through an electrically isolating body of said valve, each of which having external and independent contact means at their ends, located at the front zone of the valve.

14. The system according to claim 13, characterized in that one of the thermocouple contact mean consists of a metal ring externally mounted on the isolating body of the valve, whereas the other contact means consists of the metal body of the valve itself which includes the elements for closing the same.

15. The system according to claim 12 wherein the pressure tester incorporates: a) the processor, which is a microprocessor which registers tire pressure and temperature values when the mouthpiece of the pressure tester is coupled to the tire valve, b) a series of push-buttons, arranged for introducing into the microprocessor the value of the nominal pressure of the tire at ambient temperature; c) a display means arranged for displaying values corresponding to the tire nominal pressure, the pressure and the temperature inside the tire, the pressure equivalent to the nominal pressure as a function of the temperature inside the tire; d) a number of push-buttons which have pre-determined pressure values assigned thereto, and two other push-buttons suitable for increasing or decreasing the chosen pressure values.

16. The system according to claim 12 wherein the air supplying machine includes: a) the processor, which is microprocessor which simultaneously registers tire pressure and temperature values when the mouthpiece of a hose is coupled to the tire valve; b) a keyboard arranged for introducing the value of the nominal pressure of the tire at ambient temperature into the microprocessor; and c) a display means arranged for displaying values corresponding to the tire nominal pressure, the pressure and temperature inside the tire, the pressure equivalent to the nominal pressure as a function of the present temperature of the tire, d) a number of push-buttons which have pre-determined pressure values assigned thereto, and two other push-buttons suitable for increasing or decreasing the chosen pressure values.

17. The system according to claim 16, characterized in that the pneumatic equipment of the air supplying machine is governed by the microprocessor in order to supply the tire with the pressure equivalent to the nominal pressure in terms of temperature, mannually through the push-buttons of the machine.

18. A system for measuring and adjusting pressure of a tire, the system comprising:
   a) at least one sensor and emitter device arranged on a rim surface inside the tire for measuring pressure and temperature values in the tire and emitting such information via radiofrequency signals,
   b) at least one remote control apparatus arranged to receive radiofrequency signals,
   c) a means for calculating an appropriate pressure equivalent for the tire as a function of the measured temperature, given a nominal pressure value of the tire at ambient temperature, and
   d) a pressured-air supplying machine provided with a pneumatic inflating equipment associated to a hose for the passage of air, which ends at a connection mouthpiece.

19. The system according to claim 18 characterized in that the sensor and emitter device consists of means for measuring the pressure and the temperature inside the tire, means for emitting and receiving radiofrequency waves, means for converting radiofrequency waves into electronic signals and vice versa, a microprocessor suitable for governing the operation of the sensor and emitter device and a power supply device, preferably an electric energy supplying battery.

20. The system according to claim 18 characterized in that the remote control apparatus consists of means for emitting and receiving radiofrequency waves, means for converting radiofrequency waves into electronic signals and vice versa, a microprocessor suitable for governing the operation of the remote control apparatus, means for displaying processed data, a keyboard which consists of a series of push-buttons arranged for introducing and for changing pressure values in the remote control apparatus and a power supply device, preferably an electric energy supplying battery.

21. The system according to claim 18 characterized in that air the supplying machine essentially consists of a microprocessor suitable for governing the operation of the machine, a keyboard which consists of a series of push-buttons arranged for introducing and for changing pressure values in the air supplying machine.

22. The system according to claim 20 characterized in that the air supplying machine incorporates means for receiving radiofrequency waves and means for converting said waves into electronic signals and for supplying them to said microprocessor of said machine.

23. The system according to claim 20 characterized in that remote control apparatus is portable.

24. The system according to claim 20 characterized in that the remote control apparatus is fixed inside the vehicle, preferably on the front panel inside the same.

25. The system according to claim 24 characterized in that means for receiving and emitting radiofrequency waves are fixed on the vehicle bodywork nearby each wheel of the same.

26. The system according to claim 18, characterized in that the air supplying mouthpiece consists of an evolving body inside of which there are situated: an outlet tip threaded in an end inside a blocking body which has a generally cylindrical configuration with a portion of the same having a larger diameter and provided with a series of movable portions separated by a series of longitudinal grooves situated at a portion of smaller diameter; a cylindrical sleeve inside which there is a rod which passes through a central orifice located at a base surface at one end of the sleeve; a spring on which an end of the rod rests; an elastic joint arranged on the base surface of said sleeve; and a cervoclip located at an end of said envolving body which corresponds to said outlet tip.

27. The system according to claim 26 characterized in that the envolving body has a cylindrical portion of longer diameter on the surface of which a series of ribs are observed.

28. The system according to claim 26 characterized in that the blocking body is made of a material, preferably of metal, which has flexibility in a radial direction.

29. The system according to claim 26 characterized in that the blocking body has respective salient portions at the free end of each one of the movable portions, and the evolving body has at an end opposite to the outlet tip and at the inner surface thereof a perimeteric recess coinciding with said salient portions of the blocking body.

30. The system according to claim 26 characterized in that the rod of the air supplying mouthpiece has a cubic or rectangular-prismatic configuration at the end which remains inside the sleeve of said tip, and a plane base at the opposite end.

31. The system according to claim 26 characterized in that the evolving body is displaceable on the blocking body until the salient portions of the latter fit into the perimeteric recess of the former due to the tendency of said salient portions to move in a radial direction towards the outside in the unblocking position.

32. The system according to claim 26, characterized in that the air supplying machine includes a tool which consists of an essentially cylindrical body which has at an end thereof a cavity axially arranged to permit the placing of a rod-shaped utensil whose free end has a configuration suitable for being coupled to a valve core, said rod remaining fixed inside said cylindrical body; another cavity axially arranged at the opposite end having a first portion of larger diameter and with a key-shaped configuration suitable for manipulating valves, end caps and the like, and a second portion continuing from the first portion with a smaller diameter to allow the introduction of valve ends while they are being manipulated by the first portion.

33. The system according to claim 26, said system being automatic and including rollers which are capable of rotating in a synchronized manner around their respective axial axes and are arranged so as to permit the vehicle wheel to be placed on the same for transmitting the rotation of said rollers to said wheel, said rollers being operated by an operating mechanism such as an electric motor; a proximity detection device, an air supplying mouthpiece, an equipment for displacement of said air supplying mouthpiece, and a control equipment intended for governing the operation of the components of the system.

34. The system according to claim 23, characterized in that the operation mechanism of the rollers is managed by the control equipment.

35. The system according to claim 33 characterized in that the proximity detection device is intended for detecting the position of the tire valve during the rotation of the wheel and for sending electronic signals of proximity detection to the control equipment.

36. The system according to claim 33 characterized in that the equipment for displacing the air supplying mouthpiece receives signals from the control equipment to displace the air supplying machine to the tire valve, and effect the coupling of said mouthpiece of said valve.

* * * * *